(12) United States Patent
Faynor

(10) Patent No.: US 10,266,123 B1
(45) Date of Patent: Apr. 23, 2019

(54) MOTORCYCLE CARRIER DEVICE

(71) Applicant: Paul M Faynor, Dana Point, CA (US)

(72) Inventor: Paul M Faynor, Dana Point, CA (US)

( * ) Notice: Subject to any disclaimer, the term of this patent is extended or adjusted under 35 U.S.C. 154(b) by 0 days.

(21) Appl. No.: 15/940,161

(22) Filed: Mar. 29, 2018

(51) Int. Cl.
*B60R 9/06* (2006.01)
*B60R 9/10* (2006.01)

(52) U.S. Cl.
CPC . *B60R 9/10* (2013.01); *B60R 9/06* (2013.01)

(58) Field of Classification Search
CPC ..... B60R 9/06; B60R 9/10; B60R 2011/0084; B60R 2011/0092; Y10S 224/924; B60P 3/07
USPC .................................. 224/519, 924
See application file for complete search history.

(56) References Cited

U.S. PATENT DOCUMENTS

| | | | |
|---|---|---|---|
| 5,011,361 A * | 4/1991 | Peterson | A61G 3/0209 224/497 |
| 5,567,107 A * | 10/1996 | Bruno | B60P 3/07 241/200 |
| 5,699,985 A * | 12/1997 | Vogel | B60R 9/06 224/521 |
| 6,244,813 B1 | 6/2001 | Cataldo | |
| 6,253,980 B1 * | 7/2001 | Murakami | B60R 25/1012 224/510 |
| 6,352,401 B1 | 3/2002 | LeMay | |
| 6,502,730 B2 * | 1/2003 | Johnson | B60R 9/06 224/402 |
| 6,579,055 B1 * | 6/2003 | Williams | B60P 3/07 224/497 |
| 6,651,996 B1 * | 11/2003 | Allemang | B60D 1/52 280/402 |
| 6,655,895 B1 * | 12/2003 | Dahl | B60P 3/07 224/525 |
| 6,695,184 B2 * | 2/2004 | Higginbotham, III | B60R 9/06 224/501 |
| D528,064 S * | 9/2006 | Ezra | D12/408 |
| 7,527,282 B2 * | 5/2009 | Gilbert | B60R 9/10 224/504 |
| 8,272,547 B1 * | 9/2012 | Mital | B60R 9/10 224/501 |
| 8,327,979 B2 | 12/2012 | Lynch et al. | |
| 8,602,437 B1 * | 12/2013 | Morris | B60R 9/10 280/402 |
| 9,017,002 B1 * | 4/2015 | Joynt | B60R 9/06 414/462 |
| 9,233,634 B1 | 1/2016 | Level | |
| 9,381,867 B2 * | 7/2016 | Robinson | B60R 9/06 |
| 9,550,444 B1 * | 1/2017 | Ferreira | B60P 3/077 |
| 9,616,796 B2 * | 4/2017 | Russo | B60P 1/4485 |

(Continued)

*Primary Examiner* — Justin M Larson
(74) *Attorney, Agent, or Firm* — Eric Karich; Karich & Associates

(57) ABSTRACT

A motorcycle carrier device has a hitch tube having a hitch element for insertion into a trailer hitch of a vehicle. An upright member is affixed to the hitch tube, and an elevator having a lifting mechanism is provided for selectively raising and lowering upon the elevator with respect to the upright member. A motorcycle mounting platform is attached to the elevator so that it is raised and lowered between a raised position and a lowered position. A locking tube is provided so that when the motorcycle mounting platform is in the raised position, a locking bar is positioned through the locking tube and into the hitch tube, to lock the motorcycle mounting platform in the raised position.

12 Claims, 7 Drawing Sheets

(56) References Cited

U.S. PATENT DOCUMENTS

| | | | |
|---|---|---|---|
| 2003/0099531 A1* | 5/2003 | Williams | B60P 3/07 414/462 |
| 2003/0113196 A1* | 6/2003 | O'Leary | B60P 3/07 414/462 |
| 2003/0164390 A1* | 9/2003 | Higginbotham, III | B60R 9/06 224/519 |
| 2006/0027998 A1 | 2/2006 | Lewis | |
| 2006/0062657 A1 | 3/2006 | Davis et al. | |
| 2006/0093462 A1* | 5/2006 | Pradenas | B60P 3/07 414/462 |
| 2006/0231581 A1* | 10/2006 | Jones | B60R 9/06 224/403 |
| 2008/0044269 A1* | 2/2008 | Pradenas | B60P 3/07 414/462 |
| 2008/0290627 A1* | 11/2008 | Gilbert | B60R 9/10 280/204 |
| 2015/0197127 A1 | 7/2015 | Magestro | |
| 2015/0314734 A1* | 11/2015 | Robinson | B60R 9/06 414/462 |
| 2017/0320447 A1* | 11/2017 | Dunlap | B60R 9/10 |

* cited by examiner

MOTORCYCLE CARRIER DEVICE

BACKGROUND OF THE INVENTION

Field of the Invention

This invention relates generally to motorcycle carriers, and more particularly to a motorcycle carrier device that may be mounted on a trailer hitch of a vehicle for lifting and carrying a motorcycle behind the vehicle.

Description of Related Art

The prior art teaches a variety of lifting and/or carrying devices for transporting motorcycles. Most of the prior art motorcycle carriers lift only the front wheel of the motorcycle, due to the weight of the motorcycle and to mitigate the danger of the motorcycle carrier accidentally dropping the motorcycle during transport.

Cataldo, U.S. Pat. No. 6,244,813, teaches a motorcycle towing device that engages a front wheel of the motorcycle for lifting the front wheel and towing the motorcycle. A front end of the device includes a hitch element for insertion into a trailer hitch of the vehicle. An upright member is perpendicularly affixed to the rear end of the platform member, and an elevator is selectively raised and lowered upon the upright member by means of a jackscrew positioned atop the platform member. The elevator has a head tube and a pair of pivot bearings positioned at the top and bottom of the head tube. A similar device is also shown in Lewis, U.S. 2006/0027998.

LeMay, U.S. Pat. No. 6,352,401, teaches another device adapted to be attached to a trailer hitch of a motor vehicle for carrying motorcycles and similar vehicles. The device includes a screw, turned by a hand crank, for raising and lowering the motorcycle.

Davis, U.S. 2006/0062657, teaches a hitch mounted motorcycle carrier which includes a hitch engaging body, has a hitch engaging member configured to be removably joined to a trailer hitch receiver disposed on a motor vehicle, and a forward support column extending upwardly from one end of said hitch engaging member. A carrier housing, which has a carrier platform for carrying a motorcycle thereon. At least one control arm that has a first end portion and a second end portion, the first end portion being rotatably connected to the hitch engaging body, and the second end portion being rotatably connected to the carrier housing. At least one hold down bracket positioned on the carrier platform for securing the motorcycle to the carrier platform and an actuating assembly connected to at least one control arm and adjoined to the hitch engaging body for lifting and lowering the motorcycle.

The prior art teaches various forms of devices that both lift and carry part or all of a motorcycle on the back of a vehicle via a trailer hitch. However, the prior art does not teach a motorcycle carrier device that lifts the entire motorcycle from the ground, and includes a safety locking bar to lock the lift in a raised position to prevent the unintentional lowering of the motorcycle while the motorcycle is being transported. The present invention fulfills these needs and provides further advantages as described in the following summary.

SUMMARY OF THE INVENTION

The present invention teaches certain benefits in construction and use which give rise to the objectives described below.

The present invention provides a motorcycle carrier device that has a hitch tube having a hitch element for insertion into a trailer hitch of a vehicle. An upright member is affixed to the hitch tube, and an elevator having a lifting mechanism is provided for selectively raising and lowering upon the elevator with respect to the upright member. A motorcycle mounting platform is attached to the elevator so that it is raised and lowered between a raised position and a lowered position. A locking tube is provided so that when the motorcycle mounting platform is in the raised position, a locking bar is positioned through the locking tube and into the hitch tube, to lock the motorcycle mounting platform in the raised position.

A primary objective of the present invention is to provide a motorcycle carrier device having advantages not taught by the prior art.

Another objective is to provide a motorcycle carrier device that includes a safety locking bar to lock the lift in the raised position to prevent the unintentional lowering of the motorcycle while the motorcycle is being transported.

Another objective is to provide a motorcycle carrier device that, in some embodiments, lifts the entire motorcycle from the ground to a raised position.

A further objective is to provide a motorcycle carrier device that is quick and easy to use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
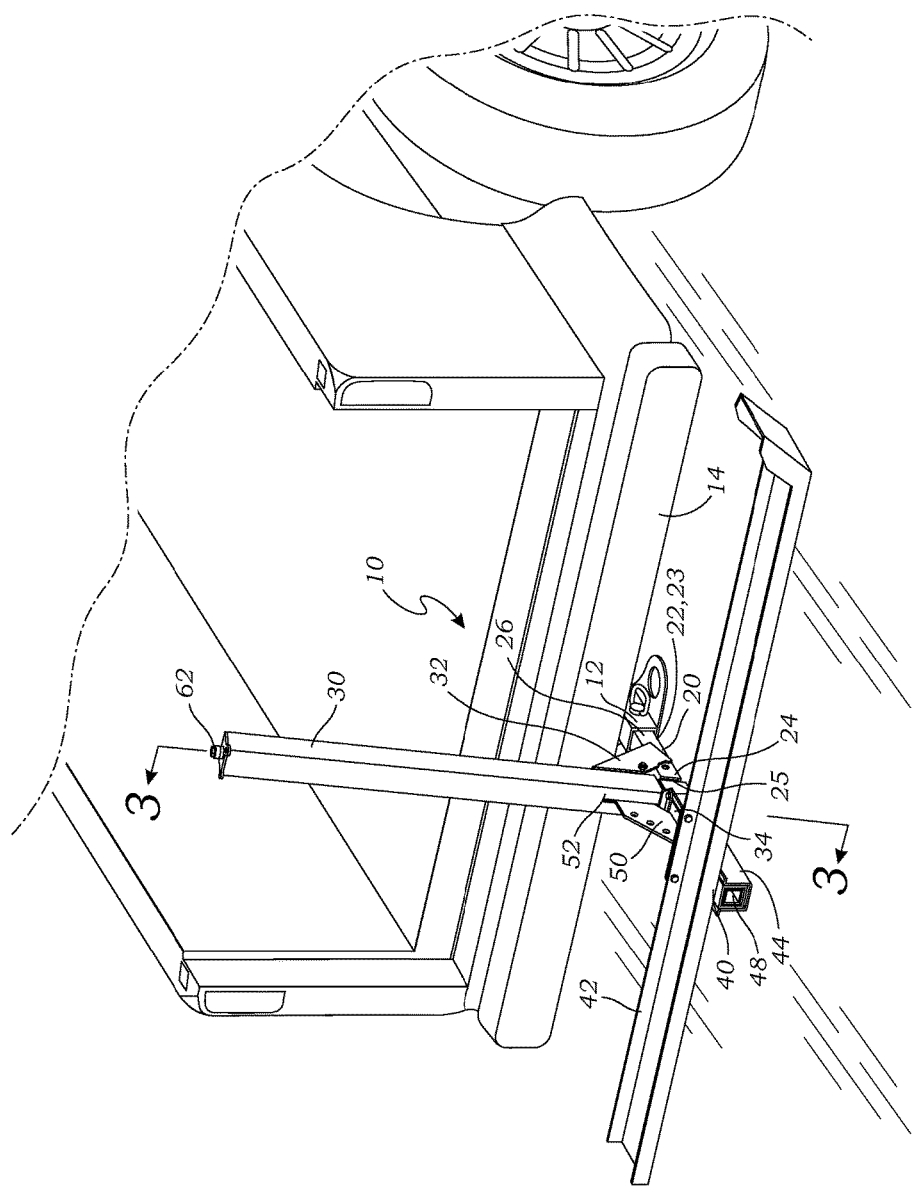
FIG. 1 is a perspective view of a motorcycle carrier device according to one embodiment of the present invention, illustrating a motorcycle mounting platform in a raised position.

The above-described drawing figures illustrate the invention, a motorcycle carrier device 10 that may be mounted on a trailer hitch 12 of a vehicle 14 for lifting and carrying a motorcycle 16 behind the vehicle 14. The motorcycle carrier device 10 preferably lifts the entire motorcycle 16 from the ground, and the motorcycle carrier device 10 preferably further includes a safety locking bar 48 to lock the lift in a raised position to prevent the unintentional lowering of the motorcycle 16 while the motorcycle 16 is being transported.

Figure 2:
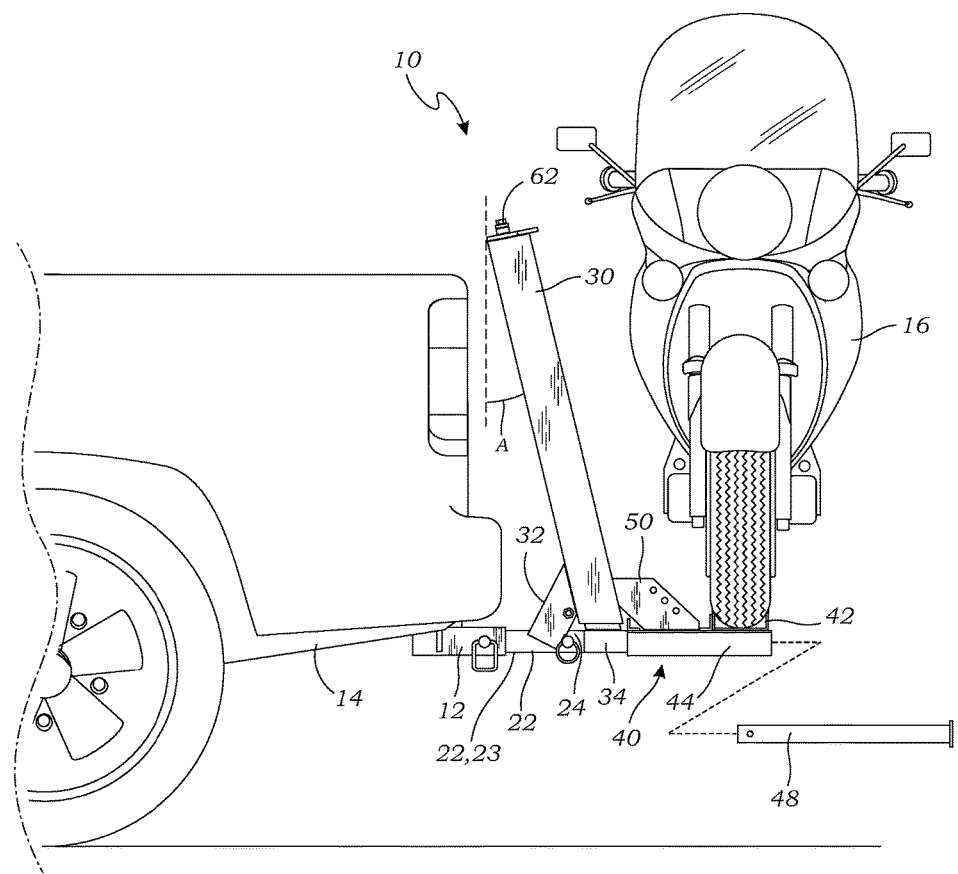
FIG. 2 is a side elevational view thereof, illustrating a motorcycle mounted on the motorcycle mounting platform.
Figure 3:
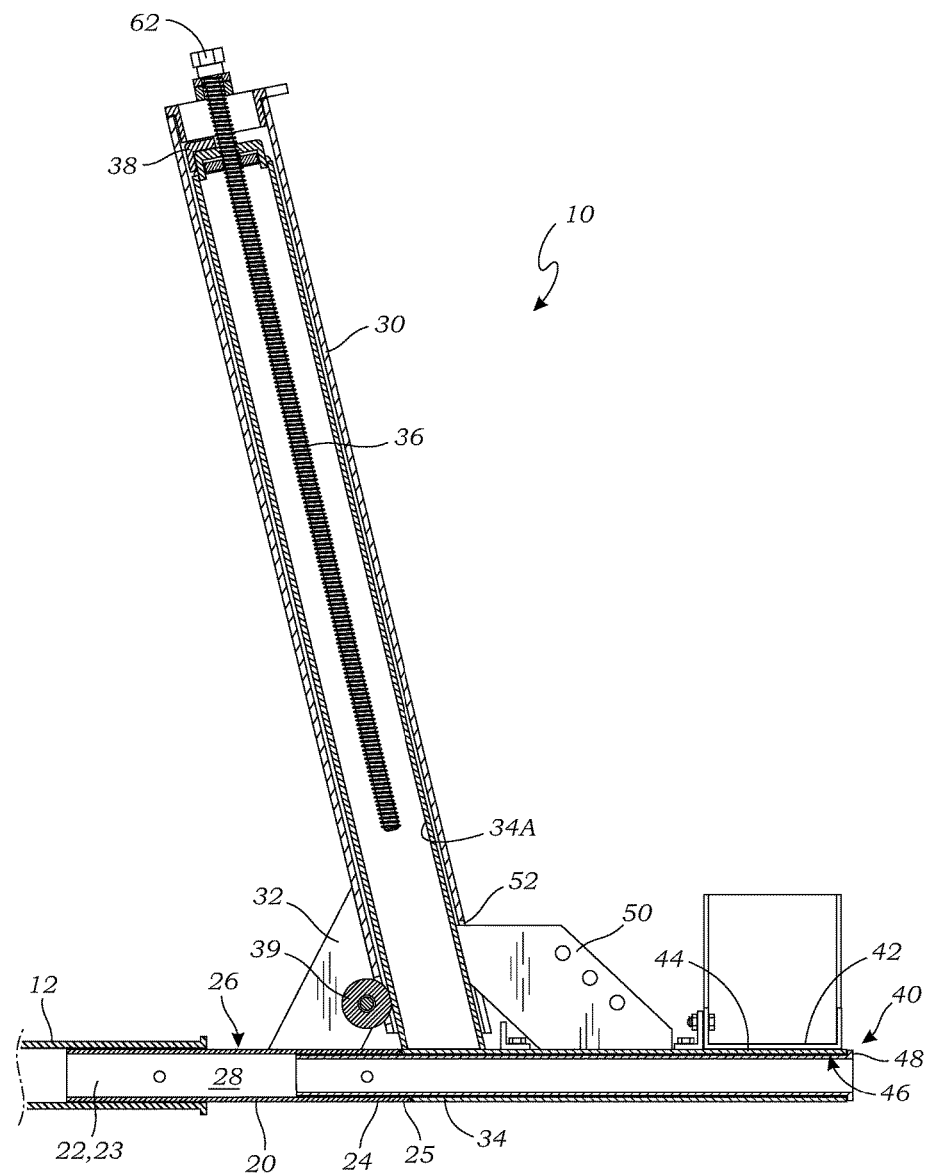
FIG. 3 is a sectional view thereof taken along line 3-3 in FIG. 1.

FIG. 1 is a perspective view of a motorcycle carrier device 10 according to one embodiment of the present invention, illustrating a motorcycle 16 mounting platform in a raised position. FIG. 2 is a side elevational view thereof, illustrating a motorcycle 16 mounted on the motorcycle mounting platform 40. FIG. 3 is a sectional view thereof taken along line 3-3 in FIG. 1.

As shown in FIGS. 1-3, the motorcycle carrier device 10 (also referred to as a "carrier device" or a "device") includes a hitch tube 20 for mounting the carrier device 10 on the trailer hitch 12 of the vehicle 14. The hitch tube 20 has a proximal end 22, a distal end 24, an outer surface 26, and an inner surface 28. The proximal end 22 of the hitch tube 20 forms a hitch element 23 for insertion into the trailer hitch 12 of the vehicle 14, and the distal end 24 of the hitch tube 20 has a distal opening 25 for receiving a locking tube 44, as described in greater detail below. The hitch tube 20 may have a square cross-section, for engaging the trailer hitch 12, and for preventing rotation of the carrier device 10 during use. However, in alternative embodiments, the hitch tube 20 may be shaped to engage other forms of vehicle 14 hitching element, and the locking tube 44 may have an alternative shape, preferably a non-round shape which resists rotation of the carrier device 10, although a round shape may be used if other structures are provided to prevent rotation of the device relative to the vehicle 14.

As shown in FIGS. 1-3, an upright member 30 is affixed to the hitch tube 20, close enough to the distal end 24 so that it does not interfere with mounting the carrier device 10 on the vehicle 14. In one embodiment, the upright member 30 is attached (e.g., welded, bolted, integrally formed, or attached in another manner known in the art) to the hitch tube 20 via a mounting bracket 32 that is welded to both the upright member 30 and the hitch tube 20. The mounting bracket 32 provides additional strength to this important load-bearing connection of the carrier device 10.

In this embodiment, the upright member 30 is positioned above the distal opening 25 of the hitch tube 20, so the it does not block the insertion of the locking bar 48 into the distal opening 25 of the hitch tube 20, as described below. It may alternatively be positioned in front of the distal opening 25 of the hitch tube 20, as long as there is an aperture (not shown) provided for the locking bar 48 to fit through.

As shown in FIGS. 1-3, an elevator 34 is provided for raising and lowering the device 10. In the present embodiment, the elevator 34 is selectively raised and lowered upon the upright member 30 by a lifting mechanism 36 such as a jackscrew, as shown in FIG. 3. While the jackscrew 36 is used in the present embodiment, alternative lifting mechanisms (e.g., jacks, hydraulic mechanisms, and other equivalent lifting mechanisms known in the art) may alternatively be used, consistent with the teachings of the present invention.

In the embodiment of FIGS. 1-3, the upright member 30 is in the form of an elongate tube having a square cross-section, and the elevator 34 includes a mating tube 34A, shown in FIG. 3, that telescopically engages the upright member 30, and the jackscrew 36 is positioned within the mating tube 34A which is inside of the upright member 30. Also shown in FIG. 3, a bearing element 38 and a roller element 39 may be provided to provide greater support to the lifting mechanism 36.

As shown in FIG. 2, in this embodiment the upright member 30 is fixedly attached to the hitch tube 20 at an angle A with respect to perpendicular to an axis of the hitch tube 20, so that the upright member 30 leans toward the vehicle 14 when the motorcycle carrier device 10 is mounted on the tow bar of the vehicle 14. In this embodiment, the angle is between 10-45 degrees.

As shown in FIGS. 1-3, a motorcycle mounting platform 40 is attached to the elevator 34 so that it is raised and lowered by the elevator 34 between a raised position (shown in FIGS. 1-3), and a lowered position (shown in FIGS. 4-6, and discussed in greater detail below). The motorcycle mounting platform 40 may include an elongate channel 42 shaped to receive the wheels of the motorcycle 16, so that the motorcycle 16 may be driven onto the motorcycle mounting platform 40. The motorcycle mounting platform 40 may further include a locking tube 44 that is positioned so that when the motorcycle mounting platform 40 is in the raised position, an internal bore 46 of the square locking tube 44 is axially aligned with the hitch tube 20, so that a locking bar 48 may slide through the square locking tube 44 and into the hitch tube 20, to lock the motorcycle mounting platform 40 in the raised position. This not only prevents the motorcycle 16 from falling or being inadvertently lowered, it also transfers the load directly to the hitch of the vehicle, and removes the load from the lifting mechanism.

In the embodiment of FIGS. 1-3, the motorcycle mounting platform 40 may be welded directly to the elevator 34, and also to a reinforcing bracket 50 that is also welded to the elevator 34. In this embodiment, the upright member 30 includes a receiver slot 52 that is shaped to receive the reinforcing bracket 50 when the motorcycle mounting platform 40 is in the raised position.

Figure 4:
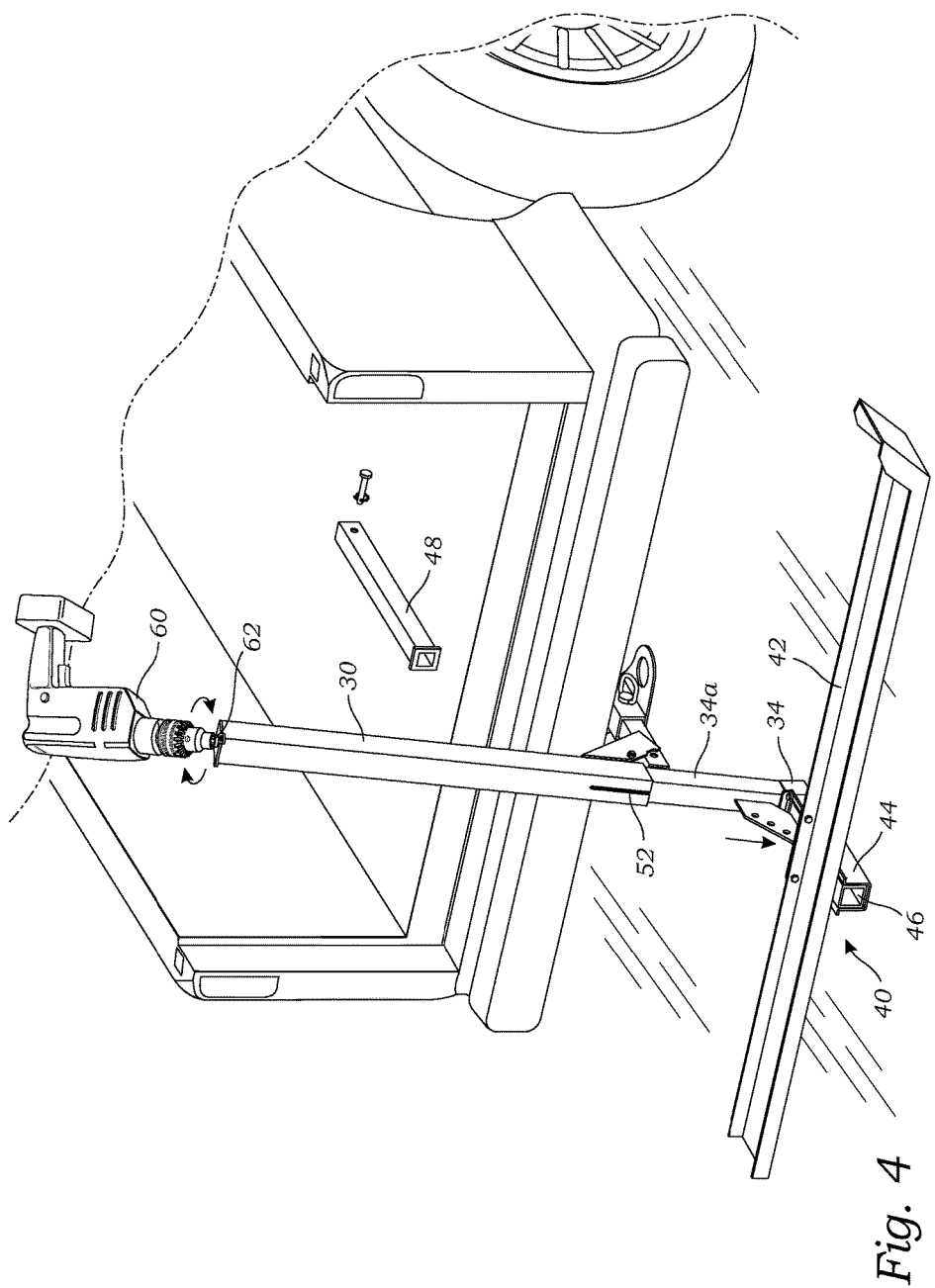
FIG. 4 is a perspective view of the motorcycle carrier device, illustrating the motorcycle mounting platform in a lowered position.
Figure 5:
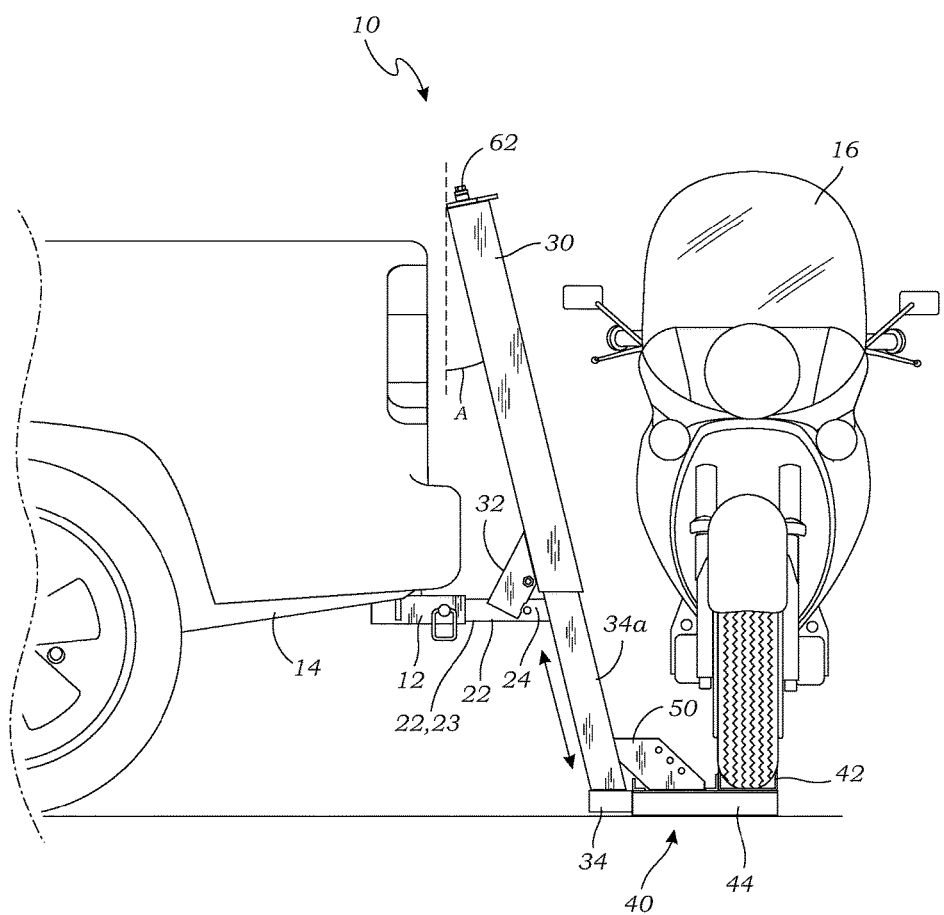
FIG. 5 is a side elevational view thereof.

FIG. 4 is a perspective view of the motorcycle carrier device 10, illustrating the motorcycle mounting platform 40 in a lowered position. FIG. 5 is a side elevational view thereof. As shown in FIGS. 4-5, once the locking bar 48 has been removed, the motorcycle mounting platform 40 may be lowered to a position that enables the user to position the motorcycle 16 on the motorcycle mounting platform 40. In the present embodiment, the motorcycle mounting platform 40 is lowered to the ground, so that the motorcycle 16 may be driven onto the motorcycle mounting platform 40.

Figure 6:
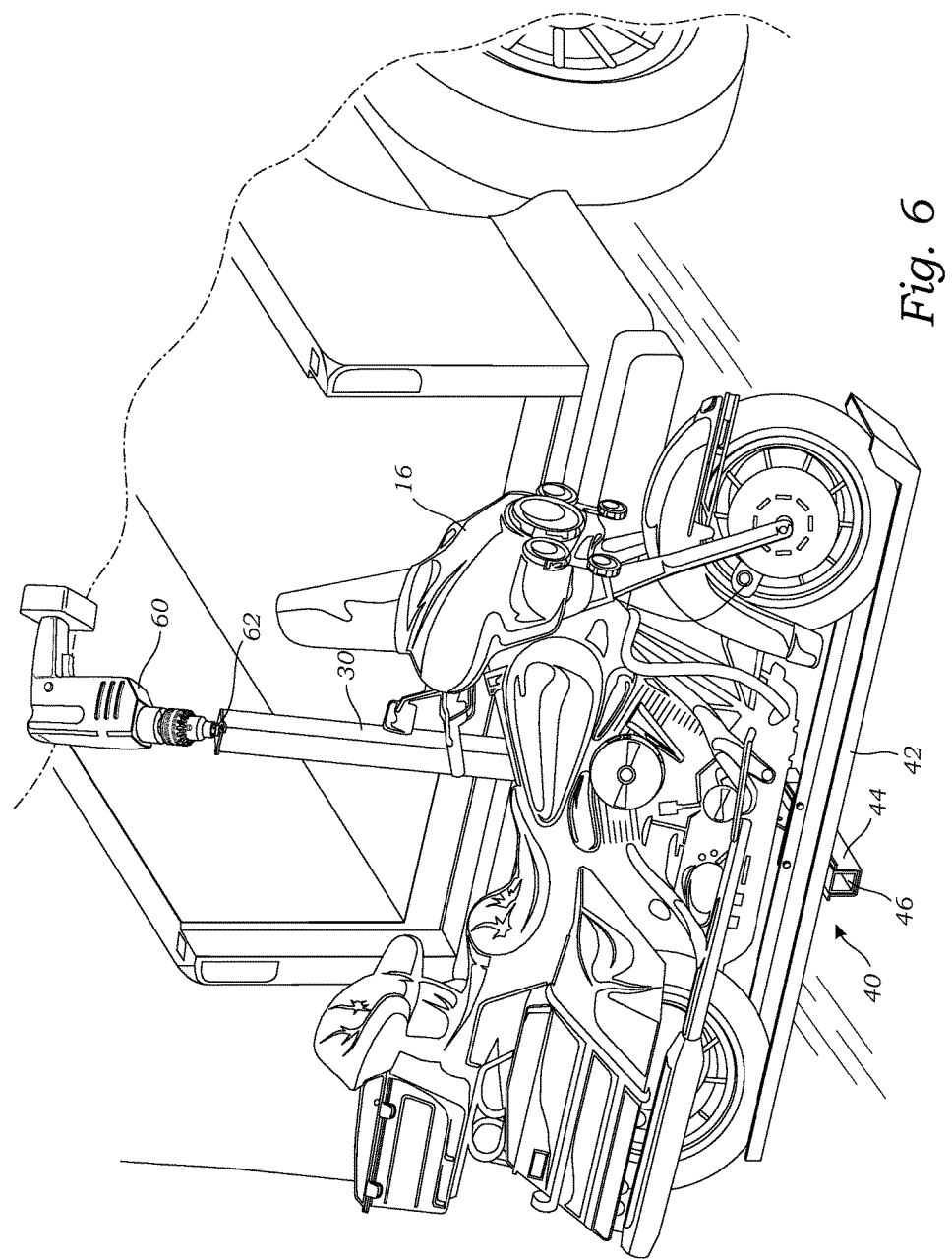
FIG. 6 is a perspective view of the motorcycle carrier device, illustrating a power tool being operably engaged with a jackscrew.
Figure 7:
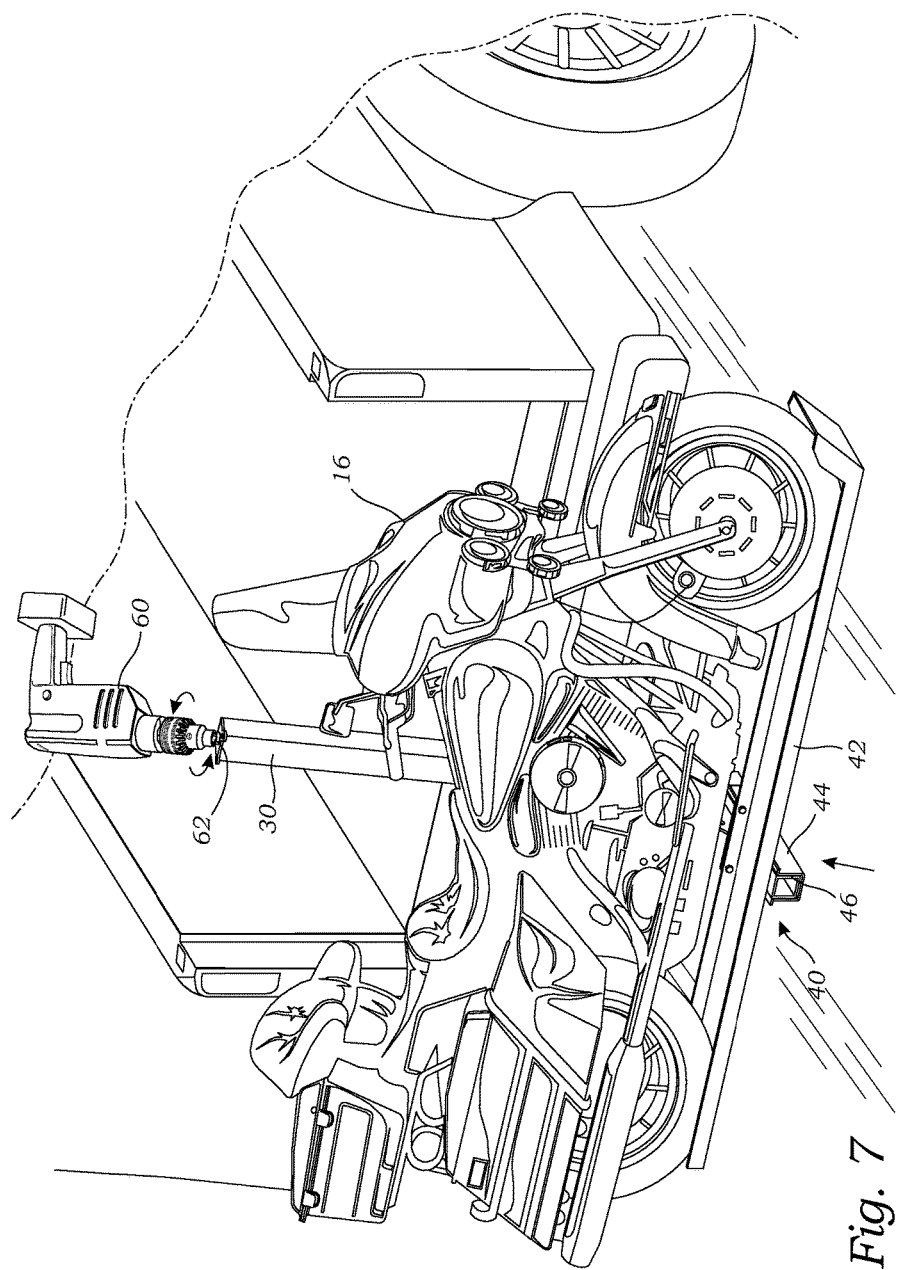
FIG. 7 is a perspective view thereof, illustrating the power tool being actuated for raising the motorcycle mounting platform.

FIG. 6 is a perspective view of the motorcycle carrier device 10 once the motorcycle 16 has been positioned onto the motorcycle mounting platform 40. A power tool 60, such as a power drill, may be operably engaged with the jackscrew 36, in this case by engaging the power tool 60 with a bolt 62 of the jackscrew 36. FIG. 7 is a perspective view of the carrier device 10, illustrating the power tool 60 being actuated for raising the motorcycle mounting platform 40. The power tool 60 drives the jackscrew 36 for raising the motorcycle 16. Alternatively, a manual crank may be used, or other method of turning the jackscrew 36 (or actuating an alternative lifting mechanism). Such alternative embodiments should be considered within the scope of the present invention, unless specifically restricted in the following claims.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A motorcycle carrier device adapted to be mounted on a trailer hitch of a vehicle for lifting and carrying a motorcycle, the motorcycle carrier device comprising:
   a hitch tube having an outer surface and an inner surface that extend to a proximal end and a distal end, the proximal end forming a hitch element for insertion into the trailer hitch of the vehicle, and the distal end having a distal opening;
   an upright member affixed to the hitch tube;
   an elevator having a lifting mechanism for selectively raising and lowering upon the elevator with respect to the upright member;
   a motorcycle mounting platform attached to the elevator so that it is raised and lowered by the elevator between a raised position and a lowered position, the motorcycle mounting platform having a locking tube that is positioned so that, when the motorcycle mounting platform is in the raised position, an internal bore of the locking tube is axially aligned with the hitch tube; and
   a locking bar sized and shaped to slide through the locking tube and into the hitch tube, to lock the motorcycle mounting platform in the raised position.

2. The motorcycle carrier device of claim 1, wherein the upright member is fixedly attached to the hitch tube at an angle with respect to perpendicular to an axis of the hitch tube, so that the upright member leans toward the vehicle when the motorcycle carrier device is mounted on the tow bar of the vehicle.

3. The motorcycle carrier device of claim 2, wherein the angle is between 10-45 degrees.

4. The motorcycle carrier device of claim 2, wherein the upright member is attached to the hitch tube via a mounting bracket that is welded to both the upright member and the hitch tube.

5. The motorcycle carrier device of claim 2, wherein the motorcycle mounting platform is welded directly to the elevator, and also to a reinforcing bracket that is also welded to the elevator.

6. The motorcycle carrier device of claim 5, wherein the upright member includes a receiver slot that is shaped to receive the reinforcing bracket when the motorcycle mounting platform is in the raised position.

7. A motorcycle carrier device adapted to be mounted on a trailer hitch of a vehicle for lifting and carrying a motorcycle, the motorcycle carrier device comprising:
   a hitch tube having a proximal end, a distal end, an outer surface, and an inner surface, the proximal end forming a hitch element for insertion into the trailer hitch of the vehicle, and the distal end having a distal opening, the hitch tube having a square cross-section;
   an upright member affixed to the distal end of the hitch tube above the distal opening;
   an elevator is selectively raised and lowered upon the upright member by a jackscrew;
   a motorcycle mounting platform attached to the elevator so that it is raised and lowered by the elevator between a raised position and a lowered position, the motorcycle mounting platform having a square locking tube that is positioned so that when the motorcycle mounting platform is in the raised position, an internal bore of the square locking tube is axially aligned with the hitch tube; and
   a locking bar sized and shaped to slide through the square locking tube and into the hitch tube, to lock the motorcycle mounting platform in the raised position.

8. The motorcycle carrier device of claim 7, wherein the upright member is fixedly attached to the hitch tube at an angle with respect to perpendicular to an axis of the hitch tube, so that the upright member leans toward the vehicle when the motorcycle carrier device is mounted on the tow bar of the vehicle.

9. The motorcycle carrier device of claim 8, wherein the angle is between 10-45 degrees.

10. The motorcycle carrier device of claim 8, wherein the upright member is attached to the hitch tube via a mounting bracket that is welded to both the upright member and the hitch tube.

11. The motorcycle carrier device of claim 8, wherein the motorcycle mounting platform is welded directly to the elevator, and also to a reinforcing bracket that is also welded to the elevator.

12. The motorcycle carrier device of claim 11, wherein the upright member includes a receiver slot that is shaped to receive the reinforcing bracket when the motorcycle mounting platform is in the raised position.

* * * * *